US008548474B2

(12) United States Patent
Kubota et al.

(10) Patent No.: US 8,548,474 B2
(45) Date of Patent: Oct. 1, 2013

(54) METHOD FOR AUTOMATIC NEIGHBOR CELL RELATION REPORTING IN A MOBILE COMMUNICATION SYSTEM

(75) Inventors: Keiichi Kubota, WeyBridge (GB); Brian A. Martin, Farnham (GB)

(73) Assignee: Renesas Mobile Corporation, Tokyo (JP)

( * ) Notice: Subject to any disclaimer, the term of this patent is extended or adjusted under 35 U.S.C. 154(b) by 188 days.

(21) Appl. No.: 12/986,393

(22) Filed: Jan. 7, 2011

(65) Prior Publication Data

US 2012/0178451 A1 Jul. 12, 2012

(51) Int. Cl.
*H04W 36/00* (2009.01)
(52) U.S. Cl.
USPC ............ 455/437; 455/436; 455/438; 455/439
(58) Field of Classification Search
USPC .......................... 455/436–444; 370/328–334
See application file for complete search history.

(56) References Cited

U.S. PATENT DOCUMENTS

| | | | | |
|---|---|---|---|---|
| 6,119,005 | A * | 9/2000 | Smolik ........................ | 455/436 |
| 6,819,923 | B1 * | 11/2004 | Friman ........................ | 455/424 |
| 2005/0009531 | A1 * | 1/2005 | Lindquist et al. .......... | 455/452.2 |
| 2006/0084443 | A1 * | 4/2006 | Yeo et al. .................... | 455/449 |
| 2006/0121907 | A1 * | 6/2006 | Mori et al. .................. | 455/447 |
| 2007/0250476 | A1 * | 10/2007 | Krasnik ........................ | 707/2 |
| 2008/0002628 | A1 * | 1/2008 | Bi et al. ....................... | 370/335 |
| 2008/0108353 | A1 * | 5/2008 | Lee et al. ..................... | 455/437 |
| 2009/0005030 | A1 * | 1/2009 | Han et al. .................... | 455/423 |
| 2009/0047955 | A1 * | 2/2009 | Frenger et al. .............. | 455/436 |
| 2009/0047968 | A1 * | 2/2009 | Gunnarsson et al. ......... | 455/446 |
| 2009/0124262 | A1 * | 5/2009 | Vela et al. ..................... | 455/442 |
| 2009/0137265 | A1 * | 5/2009 | Flore et al. ................... | 455/525 |
| 2009/0176490 | A1 * | 7/2009 | Kazmi et al. ................. | 455/434 |
| 2009/0264130 | A1 * | 10/2009 | Catovic et al. ............... | 455/436 |
| 2010/0178912 | A1 * | 7/2010 | Gunnarsson et al. ......... | 455/423 |
| 2010/0317351 | A1 * | 12/2010 | Gerstenberger et al. ..... | 455/443 |
| 2011/0188473 | A1 * | 8/2011 | Moe et al. .................... | 370/331 |
| 2011/0243097 | A1 * | 10/2011 | Lindqvist et al. ............ | 370/331 |
| 2011/0244869 | A1 * | 10/2011 | Olofsson et al. ............. | 455/442 |
| 2012/0106370 | A1 * | 5/2012 | Radulescu et al. ........... | 370/252 |

OTHER PUBLICATIONS

3GPP TS 25.331 V10.1.0 (Sep. 2010), $3^{rd}$ Generation Partnership Project; Technical Specification Group Radio Access Network; Radio Resource Control (RRC); Protocol Specification (Release 10), (1806 pages).

* cited by examiner

*Primary Examiner* — Lester Kincaid
*Assistant Examiner* — Mehmood B Khan
(74) *Attorney, Agent, or Firm* — Stanton IP Law (57) ABSTRACT

The invention concerns a method and an apparatus implementing the method. In the method is received a neighbor cell relation list and a request to report new cells not included in the neighbor cell relation list to the mobile node to a mobile node. The mobile node detects at least one new cell not included in the neighbor cell relation list and stores information regarding the at least one new cell not included in the neighbor cell relation list in a memory. The mobile node determines whether a threshold number of new cells not included in the neighbor cell relation list have been stored in the memory of the mobile node. In response to reaching the threshold number, the mobile node preparing for transmitting the information regarding the at least one new cell not included in the neighbor cell relation list to a radio network node.

15 Claims, 5 Drawing Sheets

METHOD FOR AUTOMATIC NEIGHBOR CELL RELATION REPORTING IN A MOBILE COMMUNICATION SYSTEM

BACKGROUND OF THE INVENTION

1. Field of the Invention

The invention relates to mobile communications networks, cell neighbor determination and a method for automatic neighbor cell relation reporting in a mobile communication system.

2. Description of the Related Art

Radio network planning is an important part in the building and maintaining of a cellular mobile communication network. In radio network planning it is determined, for example, the placing of base stations, the required dimensioning of base station transmitters and receivers, and base station parameterization governing transmission power or frequency allocation. There are sophisticated tools for automatically determining the placing of base stations in the area of a network. It is possible in these tools to define closely certain elementary characteristics of the network area such the terrain and buildings in the area. An important part of the radio network planning has been the determination of neighboring cells for each cell in the network. An important objective of the radio network planning tools has been the determination of neighboring cells. The correct information about neighboring cells is important for the performing of high-quality handovers between cells and the avoiding repeating frequent handovers. The handover must not be established to random cells that happen to provide an acceptable radio quality only at short random time interval. The problem is made worse by multi-path propagation of radio waves. The handover must also not be performed to cells that belong to a different network with which there may not be a roaming agreement or to cells for which handovers are not allowed for traffic reasons. Therefore, mobile nodes may not request handovers to target cells on their own.

The actual radio conditions may differ from the radio conditions determined using radio network planning tools. The cell sizes are becoming increasingly smaller. Nowadays, the cell beams are no longer omnidirectional, but instead cells with narrower beams are used. The transmission power of a cell may also vary. These are also factors that make the defining of neighboring cells more difficult to perform beforehand.

Due to the aforementioned factors it would be important to obtain automatically information about neighboring cells to a UMTS radio network.

Recently, 3G Partnership Project (3GPP) has defined an initiative for defining an Automatic Neighbor Relation (ANR) function in order to relieve the operator at least partly from the burden of manually managing Neighbor Relations (NRs). The ANR function builds a Neighbor Relation Table (NRT) to a Radio Network Controller (RNC) based on reports from the mobile node. The ANR function adds to a predefined NRT information on neighbor cells missing from the NRT. The problem with the reporting is that continuous reports from mobile nodes whenever they encounter new cells may cause a significant message load to an RNC and a NodeB. Therefore, there is a need to limit the messaging required for maintaining the NRTs in the RNCs. The need for reporting may also vary depending on whether a cell is located in a newly introduced part of the radio network or whether the cell is located in a relatively static and established part of the radio network. In densely populated urban areas, it is important to rapidly report any changes in the radio network cell neighbor relations. Further, the immediate reporting of every new cell when encountered drains mobile node battery especially during idle time, due to the superfluous messaging with a NodeB. Therefore, it would be beneficial to control how often neighbor relations are reported by a mobile node or generally by all mobile nodes within a given cell.

SUMMARY OF THE INVENTION

According to an aspect of the invention, the invention is a method, comprising: receiving a neighbor cell relation list at a mobile node; receiving a request to report new cells not comprised in the neighbor cell relation list at the mobile node; storing a threshold number of new cells, not comprised in the neighbor cell relation list, that must be detected and information of which must be stored in a memory of the mobile node, in order to reach a condition for transmitting information regarding the at least one new cell not comprised in the neighbor cell relation list; detecting, in the mobile node, at least one new cell not comprised in the neighbor cell relation list; storing information regarding the at least one new cell not comprised in the neighbor cell relation list in a memory of the mobile node; determining whether the threshold number is reached; and preparing for transmitting the information regarding the at least one new cell not comprised in the neighbor cell relation list to a radio network node.

According to a further aspect of the invention, the invention is an apparatus, comprising: at least one processor configured to receive a neighbor cell relation list, to receive a request to report new cells not comprised in the neighbor cell relation list, to store a threshold number of new cells, not comprised in the neighbor cell relation list, that must be detected and information of which must be stored in a memory, in order to reach a condition for transmitting information regarding the at least one new cell not comprised in the neighbor cell relation list, to detect at least one new cell not comprised in the neighbor cell relation list, to store information regarding the at least one new cell not comprised in the neighbor cell relation list in the memory, to determine whether the threshold number is reached, and to prepare for transmitting the information regarding the at least one new cell not comprised in the neighbor cell relation list to a radio network node.

According to a further aspect of the invention, the invention is a radio network node, comprising: at least one processor configured to broadcast neighbor cell relation list, to transmit a request to report new cells not comprised in the neighbor cell relation list to the mobile node, the request comprising a threshold number of new cells not comprised in the neighbor cell relation list that must be detected by mobile nodes before reporting, and to receive information regarding at least one new cell not comprised in the neighbor cell relation list.

According to a further aspect of the invention, the invention is a computer program comprising code adapted to cause the following when executed on a data-processing system: receiving a neighbor cell relation list; receiving a request to report new cells not comprised in the neighbor cell relation list; storing a threshold number of new cells, not comprised in the neighbor cell relation list, that must be detected and information of which must be stored in a memory, in order to reach a condition for transmitting information regarding the at least one new cell not comprised in the neighbor cell relation list; detecting at least one new cell not comprised in the neighbor cell relation list; storing information regarding the at least one new cell not comprised in the neighbor cell relation list in the memory; determining whether the threshold number is reached; and preparing for transmitting the information regarding the at least one new cell not comprised in the neighbor cell relation list to a radio network node.

According to a further aspect of the invention, the invention is a computer program product comprising code adapted to cause the following when executed on a data-processing system: receiving a neighbor cell relation list; receiving a request to report new cells not comprised in the neighbor cell relation list; storing a threshold number of new cells, not comprised in the neighbor cell relation list, that must be detected and information of which must be stored in a memory, in order to reach a condition for transmitting information regarding the at least one new cell not comprised in the neighbor cell relation list; detecting at least one new cell not comprised in the neighbor cell relation list; storing information regarding the at least one new cell not comprised in the neighbor cell relation list in the memory; determining whether the threshold number is reached; and preparing for transmitting the information regarding the at least one new cell not comprised in the neighbor cell relation list to a radio network node.

According to a further aspect of the invention, the invention is a method, a computer program or an apparatus configured to execute the method. The method comprising the following, or the computer program comprising code adapted to cause the following when executed on a data-processing system: receiving a neighbor cell relation list at a mobile node; receiving a request to report new cells not comprised in the neighbor cell relation list at the mobile node; storing a threshold number of new cells, not comprised in the neighbor cell relation list, that must be detected and information of which must be stored in a memory of the mobile node, in order to reach a condition for transmitting information regarding the at least one new cell not comprised in the neighbor cell relation list; detecting, in the mobile node, at least one new cell not comprised in the neighbor cell relation list; storing information regarding the at least one new cell not comprised in the neighbor cell relation list in a memory of the mobile node; determining whether the threshold number is reached; and transmitting the information regarding the at least one new cell not comprised in the neighbor cell relation list to a radio network node.

In one embodiment of the invention, the preparing for transmitting the information regarding the at least one new cell, not comprised in the neighbor cell relation list, comprises that the mobile node indicates to the radio network node availability of the information. The preparing for transmitting the information regarding the at least one new cell, not comprised in the neighbor cell relation list, may comprise allowing a response to a request message from the radio network node that request the information, for example, that such a message is not considered to invoke an error condition. The preparing for transmitting may also comprise packing the information regarding the at least one new cell, not comprised in the neighbor cell relation list, to a message structure in the mobile node memory that corresponds to a radio interface message for the reporting.

In one embodiment of the invention, the information regarding the at least one new cell not comprised in the neighbor cell relation list received to a radio network node is transmitted to a further radio network node such as a radio network controller. The radio network node may be a UMTS NodeB (NB).

In one embodiment of the invention, the request to report new cells not comprised in the neighbor cell relation list is transmitted to the radio network node from a further radio network node such as a radio network controller. The radio network node may be a UMTS NodeB (NB).

In one embodiment of the invention, the method further comprises determining a need for uplink data transmission; and, in response to the need for uplink data transmission, preparing for transmitting or transmitting the information regarding the at least one new cell not comprised in the neighbor cell relation list to the radio network node.

In one embodiment of the invention, the threshold number is received in association with the request to report new cells not comprised in the neighbor cell relation list. The threshold number may be received on the same channel as the request to report new cells not comprised in the neighbor cell relation list. The channel may be a broadcast channel or a dedicated channel. The threshold number may be received on a separate channel to the request to report new cells not comprised in the neighbor cell relation list. The channel used to transmit the request to report new cells not comprised in the neighbor cell list or the threshold number may be a dedicated control channel or a broadcast channel. The request to report new cells not comprised in the neighbor cell list may be transmitted on a dedicated control channel whereas the threshold number may be transmitted on a broadcast channel or vice versa.

The threshold number and the request may be received in the same radio resource control message from the radio network node to the mobile node. The threshold number and the request may be received in separate radio resource control messages from the radio network node to the mobile node.

In one embodiment of the invention, the information, regarding the at least one new cell not comprised in the neighbor cell relation list, comprises a cell identifier for the cell in which the request to report was received and cell identifiers for the new cells not comprised in the neighbor cell relation list.

In one embodiment of the invention, the method further comprises conducting a cell search by the mobile node.

In one embodiment of the invention, indicating the availability of information on at least one new cell not comprised in the neighbor cell relation list to the radio network node in at least one of a connection request message, a connection setup complete message, a cell update message, a routing area update message, or a reconfiguration complete message. The routing area update message may be a UMTS Routing Area (URA) update message.

In one embodiment of the invention, the method further comprises receiving, from the radio network node, an information request message for the at least one new cell not comprised in the neighbor cell relation list, and transmitting, by the mobile node, the at least one new cell not comprised in the neighbor cell relation list to the radio network node in an information response message.

In one embodiment of the invention, the request to report new cells not comprised in the neighbor cell relation list is provided on a broadcast channel.

In one embodiment of the invention, the request to report new cells not comprised in the neighbor cell relation list is comprised in a system information block.

In one embodiment of the invention, the request to report new cells not comprised in the neighbor cell relation list is provided on a dedicated control channel.

In one embodiment of the invention, the request to report new cells not comprised in the neighbor cell relation list is comprised in a Radio Resource Control (RRC) message.

In one embodiment of the invention, the request to report new cells not comprised in the neighbor cell relation list further comprises the threshold number.

In one embodiment of the invention, the mobile node comprises a UMTS User Equipment (UE).

In one embodiment of the invention, the mobile node comprises a Long-Term Evolution (LTE) User Equipment.

In one embodiment of the invention, the radio network node is a UMTS Radio Access Network (UTRAN) node, for example, a Radio Network Controller (RNC).

In one embodiment of the invention, the radio network node is an Evolved UMTS Radio Access Network (E-UTRAN) node.

In one embodiment of the invention, the radio network node comprises a UMTS NodeB. In one embodiment of the invention, the radio network node is any base station or a controller unit associated with at least one base station.

In one embodiment of the invention, the computer program causes the processor to communicate with at least one RE-circuit to receive a neighbor cell relation list at a mobile node, to receiving a request to report new cells not comprised in the neighbor cell relation list at the mobile node. The computer program also causes the processor to communicate with the at least one RF-circuit to detect at least one new cell not comprised in the neighbor cell relation list. The computer program also causes the processor to communicate with the at least one RF-circuit to transmit the information regarding the at least one new cell not comprised in the neighbor cell relation list to a radio network node.

In one embodiment of the invention, the computer program causes the processor to communicate with the at least one RF-circuit in order to receive and transmit any information related to the information exchange between the mobile node and the radio network node. The receiving of information may also comprise information broadcasted by the radio network node.

In one embodiment of the invention, the threshold number may be set to a value that exceeds the number of neighbor cells that any cell may have. The value may be a high-value, that is, a highest positive value that may be carried in the field used to transmit the threshold value from the radio network node. The fact that the threshold number N is set to a value that exceeds the number of neighbor cells that any cell may have causes that the mobile node reports the new cells not comprised in the neighbor cell relation list gathered in the mobile node memory only when there are other reasons to transmit data in uplink direction such as, for example, at least one of a cell update, uplink user plane data and a registration to a mobility management entity.

In one embodiment of the invention, the radio network node comprises a WCDMA based radio network node, for example, a Radio Network Controller (RNC) or a NodeB.

In one embodiment of the invention, the radio network node comprises an OFDMA based radio network node.

In one embodiment of the invention, the mobile node such as a User Equipment (UE) comprises a mobile station or generally a mobile terminal. In one embodiment of the invention a user of a mobile terminal is identified using a subscriber module, for example, User Services Identity Module (UMTS) or a Subscriber Identity Module (SIM). The combination of Mobile Equipment (ME) and a subscriber module may be referred to as a mobile subscriber.

In one embodiment of the invention, the apparatus is a mobile handset.

In one embodiment of the invention, the apparatus is a chipset.

In one embodiment of the invention, the radio network node is configured to be used in at least one of a Global System of Mobile Communications (GSM) network, a Universal Mobile Telephone System (UMTS) network and a 4G system such as LTE Evolved Packet System (EPS).

In one embodiment of the invention, the computer program is stored on a computer readable medium. The computer readable medium may be, but is not limited to, a removable memory card, a removable memory module, a magnetic disk, an optical disk, a holographic memory or a magnetic tape. A removable memory module may be, for example, a USB memory stick, a PCMCIA card or a smart memory card.

In one embodiment of the invention, the computer program product is stored on a computer readable medium. The computer readable medium may be, but is not limited to, a removable memory card, a removable memory module, a magnetic disk, an optical disk, a holographic memory or a magnetic tape. A removable memory module may be, for example, a USB memory stick, a PCMCIA card or a smart memory card.

The embodiments of the invention described hereinbefore may be used in any combination with each other. Several of the embodiments may be combined together to form a further embodiment of the invention. A method, a system, an apparatus, a computer program or a computer program product to which the invention is related may comprise at least one of the embodiments of the invention described hereinbefore.

The benefits of the invention are related to the minimizing of messaging over the radio interface between the mobile node and the radio network node. A further benefit is decreased mobile node battery consumption. An even further benefit of the invention is that by setting the threshold number to one, it is possible for the radio network node to deactivate the reporting immediately after receiving one report from the mobile node. An even further benefit of the invention is that by setting the threshold number to a number that is never reached in normal cells or to an infinity or high-value value, the radio network node may instruct the mobile node to report new cells only when there is otherwise need to transmit uplink data.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
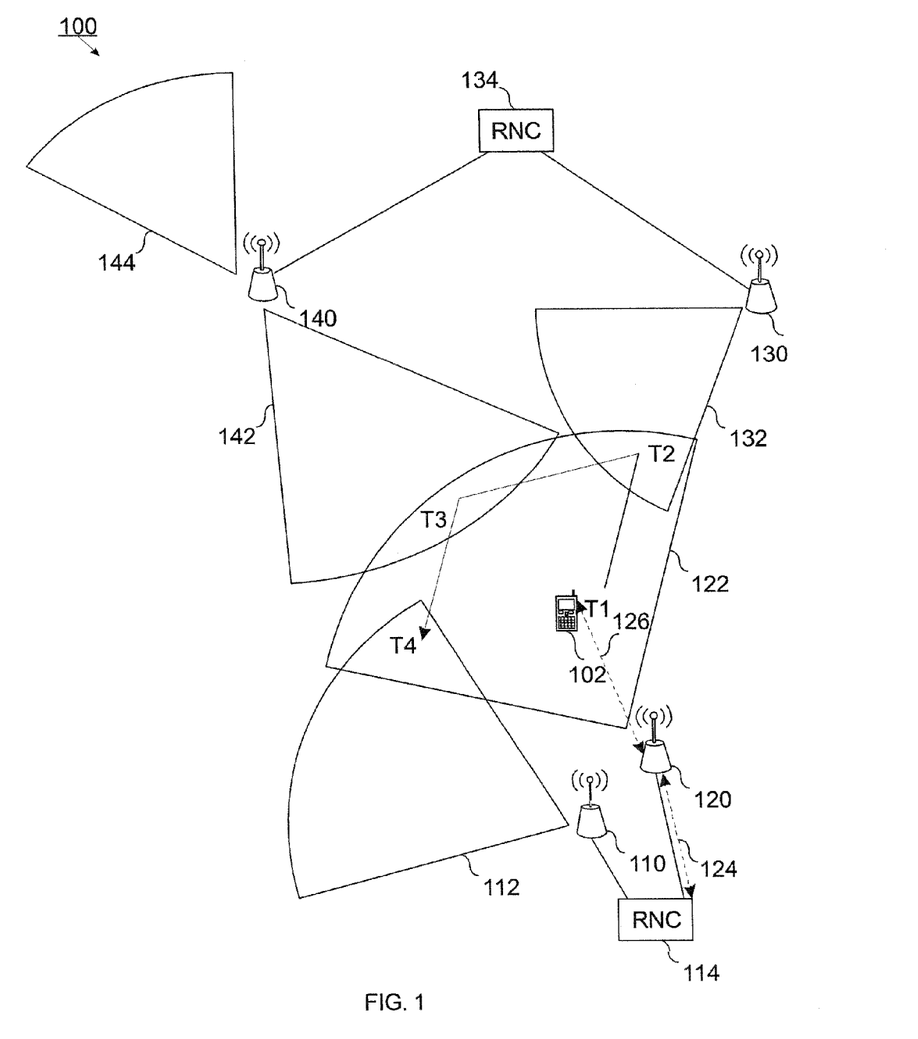
FIG. 1 is a block diagram illustrating a radio network and a mobile node applying a method for automatic reporting of neighbor relations in one embodiment of the invention.

FIG. 1 is a block diagram illustrating a radio network and a mobile node applying a method for automatic reporting of neighbor cell relations in one embodiment of the invention. The network may be a UMTS Terrestrial Radio Access Network (UTRAN). The network may also be any cellular radio access network such as, for example, an E-UTRAN or a GSM-Edge Radio Access Network (GERAN). In FIG. 1 there is illustrated a system 100 comprising four NBs, namely, NBs 110, 120, 130 and 140. There are five cell beams, namely, beams 112, 122, 132 and 142 and 144. Beams 112, 122 and 132 are provided by NBs 110, 120 and 130, respectively. Beams 142 and 144 are provided by NB 140. NB 110 and NB 120 are connected to an RNC 114. NB 130 and NB 140 are connected to an RNC 134.

In FIG. 1 there is also a mobile node 102, such as a mobile station or a mobile terminal. Mobile node 102 is camping in cell 122. Mobile node 102 may be assumed to be in the idle mode, where no dedicated channels are used.

Initially, at time T1 mobile node 102 receives a request to perform automatic neighbor cell relation reporting from RNC 114 via NB 120 in cell 122, as illustrated with arrows 124 and 126. The request illustrated with arrow 126 may be transmitted by NB 120 on a dedicated control channel, if mobile node 102 is not in the idle mode. The request may also be broadcasted by NB 120, for example, in a System Information Block (SIB) that comprises cell related parameters. The SIB may be, for example, SIB type 3 or SIB type 5. SIB type 3 contains parameters for cell selection and re-selection, whereas the SIB type 5 contains parameters for the configuration of the common physical channels in the cell. The request to perform automatic neighbor cell relation reporting may comprise, in addition to the mere indication to perform such reporting in the first place, a value N, which indicates the number of neighbor cell entries that must be stored in a local Neighbor cell Relation Table (NRT) within mobile node 102 memory before the local NRT is reported by mobile node 102. By an NRT is meant a neighbor cell relation table. In the example of FIG. 1, it is assumed that N=3. The number N may also be an arbitrary natural number such as, for example, 2, 5, 6, 7, 8, 9 or 10. The number N may also be set to a high-value. The local NRT entries may comprise an identifier of the cell in which mobile node 102 is camping, when detecting neighbor cells, and an identifier of a detected neighbor cells. There may be an entry for each neighbor cell. The entries may also comprise at least one of a physical cell identifier, a primary scrambling code, an E-UTRAN Cell Global Identifier (ECGI), a cell identity, a Public Land Mobile Network (PLMN) identifier. The entries may comprise this information for each neighbor cell and the current cell. It must be noted that the neighbor cell entries are collected regarding only cells that are not included in a Neighbor Cell Relation (NCR) list received from NB 120 in cell 122. A neighbor cell relation (NCR) list is a list associated with a cell that lists relevant candidate cells for handover. Such relevant candidate cells are usually neighbor cells. If the mobile node is not in idle mode, NB 120 may transmit a message to mobile node 102 carrying the request to perform automatic neighbor cell relation reporting.

As time passes, mobile node 102 moves to the direction of the area where cell 122 overlaps with another cell 132. The movement of mobile node 102 is assumed to be random. Mobile node 102 has no prior knowledge of the radio network configuration that would determine the movement.

At time T2 mobile node 102 detects cell 132. In response to the detection, mobile node 102 attempts to listen to a number of parameters associated with cell 132 as broadcasted by NB 130 on at least one broadcast channel. Mobile node 102 may store information, for example, on at least one of the Physical Cell Identifier (PCI), a primary scrambling code, E-UTRAN Cell Global Identifier (ECGI), a cell identity and Public Land Mobile Network (PLMN) identifier to a local Neighbor cell Relation Table (NRT) regarding cell 132 within a memory of the mobile node 102. Thereupon, mobile node 102 moves to an area where cells 122 and 142 overlap.

At time T3 mobile node 102 detects cell 142 provided by NB 140. In response to the detection, mobile node 102 attempts to listen to a number of parameters associated with cell 142 as broadcasted by NB 140. Mobile node 102 may store information, for example, on at least one of the Physical Cell Identifier (PCI), a primary scrambling code, E-UTRAN Cell Global Identifier (ECGI), a cell identity and Public Land Mobile Network (PLMN) identifier regarding cell 142 to a local Neighbor cell Relation Table (NRT) within a memory of the mobile node 102. Thereupon, mobile node 102 moves to an area where cells 122 and 112 overlap.

At time T4 mobile node 102 detects cell 112. In response to the detection, mobile node 102 attempts to listen to a number of parameters associated with cell 112 as broadcasted by NB 110. Mobile node 102 may store information, for example, on at least one of the Physical Cell Identifier (PCI), a primary scrambling code, E-UTRAN Cell Global Identifier (ECGI), a cell identity and Public Land Mobile Network (PLMN) identifier regarding cell 112 to a local Neighbor cell Relation Table (NRT) within a memory of the mobile node 102. Due to the fact that cell 112 is the third neighbor cell not listed in neighbor cell relation list broadcasted by NB 120 in cell 122, mobile node 102 detects that N=3 and that the local NRT must be reported to NB 120, in other words, that the information in the NRT entries must be reported. Mobile node 102 in idle mode performs necessary radio resource allocations for transmitting to NB 120 in uplink direction and transmits the local NRT to NB 120. NB 120 may transmit the information in the local NRT to RNC 114.

In one embodiment of the invention, in order to be able to perform the reporting in idle mode, mobile node 102 sends a radio resource connection request to NB 120. The radio resource connection request carries an indicator that automatic neighbor cell relation information is available. In response, NB 120 sends a radio resource connection setup message to mobile node 102. Mobile node 102 replies with a radio resource connection setup complete message. Due to the fact that NB 120 has received the indicator for automatic neighbor cell relation information, NB 120 sends a UE (User Equipment) information request message comprising an indicator for automatic neighbor cell relation information request. In response to the receiving the UE information request message, mobile node 102 sends the local NRT entries to NB 120, that is, the collected automatic neighbor cell relation information regarding neighbor cells.

In one embodiment of the invention, should mobile node 102 have been in a state where a radio bearer or a forward access channel is available to mobile node 102 for communicating with NB 120, such as, for example, in the cell-DCH state or in the cell-FACH state, mobile node 102 may indicate the availability of automatic neighbor cell relation information in a cell update message using an indicator bit in the cell update message. A cell update confirm sent by NB 120 in response causes mobile node 102 to move to the cell-FACH state. Mobile node 102 responds with a mobility information confirm message to NB 120, which sends a UE information request message comprising an indicator for automatic neighbor cell relation information request. In response to the receiving the UE information request message, mobile node 102 sends the local NRT entries to NB 120, that is, the collected automatic neighbor cell relation information regarding neighbor cells. NB 120 may transmit the information in the local NRT to RNC 114.

The embodiments of the invention described hereinbefore in association with FIG. 1 may be used in any combination with each other. Several of the embodiments may be combined together to form a further embodiment of the invention.

Figure 2A:
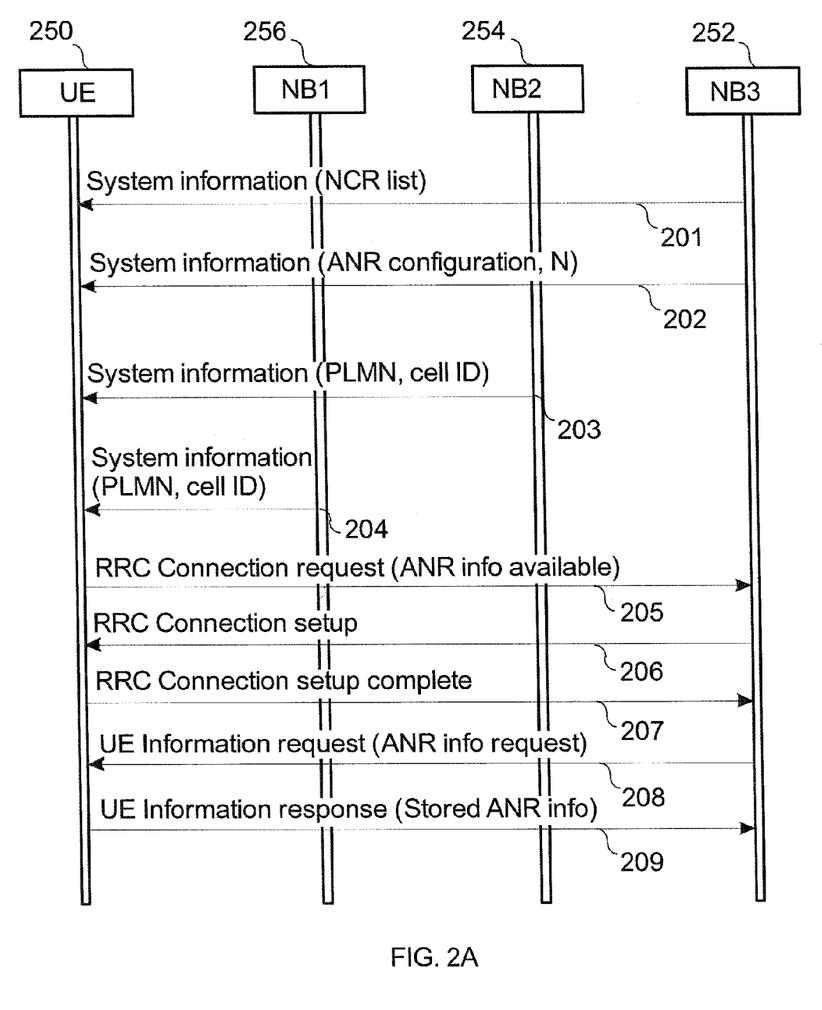
FIG. 2A is a message sequence chart illustrating a method for automatic reporting of neighbor relations when the mobile node is in idle mode in one embodiment of the invention.

FIG. 2A is a message sequence chart illustrating a method for automatic reporting of neighbor cell relations when the mobile node is in idle mode in one embodiment of the invention. In FIG. 2A there is a mobile node 250, in other words, User Equipment (UE) or a mobile station or a mobile terminal. There are also NBs 252, 254 and 256, which may also be called base stations or base transceiver stations. In FIG. 2A the starting point is that mobile node 250 is in the idle mode.

As illustrated with arrow 201, NB 252 broadcasts system information so that it is received by mobile node 250. The system information may comprise a Neighbor Cell Relation (NCR) list, which comprises identifiers of neighbor cells. The identifiers may be Physical Cell Identifiers (PCI), Primary Scrambling Codes (PSC), Cell Identities or ECGIs.

Figure 2B:
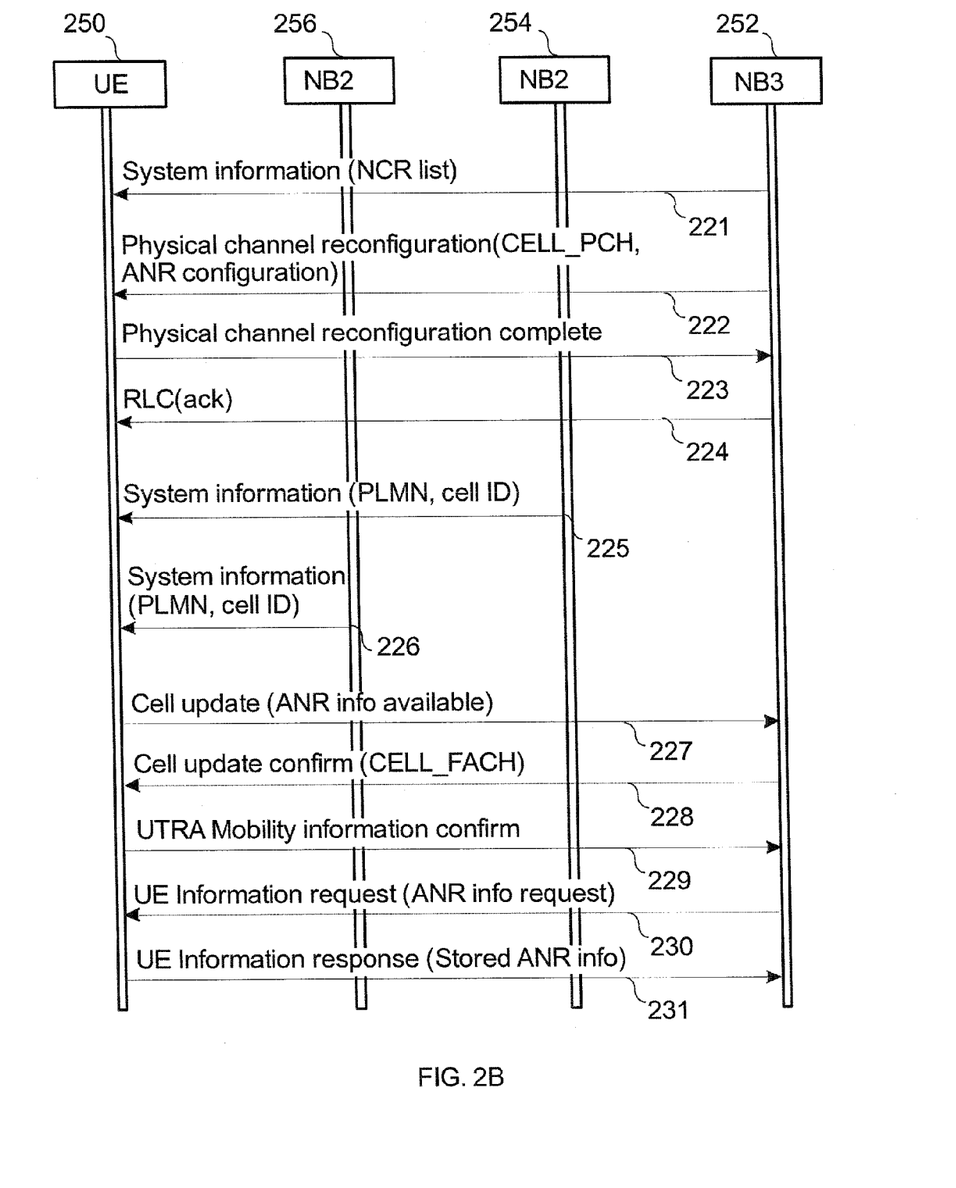
FIG. 2B is a message sequence chart illustrating a method for automatic reporting of neighbor relations when the mobile node is in a connected mode in one embodiment of the invention.

As illustrated with arrow 202, NB 252 broadcasts system information so that it is received by mobile node 250. The system information comprises an indication to perform automatic neighbor cell relation reporting. The indication may be a value N or the indication may comprise a value N, which indicates to mobile node 250 how many new neighbor cells, which are not already included in the Neighbor Cell Relation (NCR) list broadcasted by NB 252, must be detected before they are to be reported to NB 252. In the example of FIG. 2B the indication comprises N=2. The indication may also comprise separately an indicator to perform automatic neighbor cell relation reporting and the value N.

In one embodiment of the invention, the value N may be any natural number or integer. The value may also be stored or transmitted in a fixed decimal point field or a floating point field. The value of N may also be any integer between 1 and a positive natural number that represents the highest number of neighbor cells that a cell may have.

In one embodiment of the invention, the requirement to perform automatic neighbor cell relation reporting from mobile stations in the current cell of mobile node 250 may be configured to NB 252 in response to a request from a Radio Network Controller (RNC) (not shown), from an operations and maintenance centre or node (not shown) or from a Self-Organizing Network (SON) node.

In one embodiment of the invention, the requirement to perform automatic neighbor cell relation reporting from mobile stations in the current cell of mobile node 250 may be determined by a Radio Network Controller (RNC) connected to NB 252 independently based on measurement parameters obtained by NB 252 from at least one mobile node. The requirement may also be derived by the RNC based on at least one network configuration related message from at least one other RNC.

In one embodiment of the invention, there may be a separate indicator to request the performing of automatic neighbor cell reporting and a separate threshold value N, indicating the number of new neighbor cells to be detected before reporting.

In one embodiment of the invention, a non-zero value for the threshold value N indicates that automatic neighbor cell reporting must be performed.

In one embodiment of the invention, the indicator to perform automatic report is carried in an E-UTRAN system information block, for example, in system information block of type 3 or in system information block of type 5.

As illustrated with arrow 203, NB 254 broadcasts system information so that it is received by mobile node 250. The system information comprises a PLMN identifier and a cell identifier, which may be a PCI/PSC or an ECGI. In response to the reception of the system information, mobile node 250 detects that the cell identified by the cell identifier does not belong to the NCR list. Hence, mobile node 250 records information on the cell broadcasted by NB 254 to an entry in a local neighbor cell relation table. The table comprises entries comprising at least an identifier of the cell that sent the automatic neighbor cell reporting request and an identifier of the new cell detected that do not belong to the NCR list. The cell identifiers may comprise PCIs/PSCs or ECGIs/cell identities. There is an entry for each cell detected by mobile node 250 during a cell search that does not belong to NCR list.

As illustrated with arrow 204, NB 256 broadcasts system information so that it is received by mobile node 250. The system information comprises a PLMN identifier and a cell identifier, which may be a PCI/PSC or an ECGI/cell identity. In response to the reception of the system information, mobile node 250 detects that the cell identified by the cell identifier does not belong to the NCR list. Hence, mobile node 250 records information on the cell broadcasted by NB 256 to an entry in a local neighbor cell relation table in the memory of mobile node 250. Due to the fact that mobile node 250 detects that it has collected two entries in its memory, mobile node 250 starts reporting the local neighbor cell relation table information to NB 252.

In order to be able to send the automatic neighbor cell relation table information to NB 252, mobile node 250 must establish a radio bearer to NB 252. In order to establish the radio bearer to NB 252, mobile node 250 sends a Radio Resource Control (RRC) connection request message to NB 252, as illustrated with arrow 205. The RRC connection request message comprises an indicator, for example, a bit, which indicates that automatic neighbor relation information is available to NB 252.

As illustrated with arrow 206, NB 252 detects the indicator indicating the availability of automatic neighbor relation information and sends an RRC connection setup message to mobile node 250.

As illustrated with arrow 207, mobile node 250 sends a RRC connection setup complete message to NB 252.

As illustrated with arrow 208, NB 252 sends a UE information request message to mobile node 250, which comprises a request to return automatic neighbor relation information collected.

As illustrated with arrow 209, mobile node 250 sends the local neighbor cell relation table to NB 252 in a UE information response message.

The embodiments of the invention described hereinbefore in association with FIG. 2A may be used in any combination with each other. Several of the embodiments may be combined together to form a further embodiment of the invention.

FIG. 2B is a message sequence chart illustrating a method for automatic reporting of neighbor cell relations when the mobile node is in a connected mode in one embodiment of the invention.

In FIG. 2B there is a mobile node 250, in other words, User Equipment (UE). There are also NBs 252, 254 and 256, which may also be called base stations or base transceiver stations. The starting point in FIG. 2B is that mobile node 250 is in either cell-FACH or cell-DCH state. This may mean that the mobile node 250 is in connected mode. In cell-FACH state mobile node 250 does not use dedicated channels for communicating with NB 252, but it uses instead Forward Access Channel (FACH). In cell-DCH state mobile node 250 uses dedicated channel for both uplink and downlink transmission.

As illustrated with arrow 220, NB 252 broadcasts system information so that the system information is received by mobile node 250. The system information comprises a Neighbor Cell Relation (NCR) list, which comprises identifiers of neighbor cells. The identifiers may be Physical Cell Identifiers (PCI)/Primary Scrambling Codes (PSC) or ECGIs/cell identities.

As illustrated with arrow 221, NB 252 sends an RRC physical channel reconfiguration message. The physical channel reconfiguration message comprises parameters indicating for mobile node 250 to enter the cell-PCH state and an indicator to perform automatic neighbor cell relation reporting. The indicator may be a value N, which indicates to mobile node 250 how many new neighbor cells, which are not already included in the Neighbor Cell Relation (NCR) list broadcasted by NB 252, must be detected before they are to be reported to NB 252. In the example of FIG. 2B N=2. The value N may be an arbitrary natural number. The indicator may also comprise separately an indicator to perform automatic neighbor cell relation reporting and the value N. In cell-PCH state mobile node 250 has no uplink radio resource allocated. The value N may be set to a value that is lower than a typical number of neighbor cells that a cell may have.

In one embodiment of the invention, in a hexagonal cell installation there are typically six neighbor cells. In order to avoid the reporting of every new cell encountered, assuming that the NCR list is empty, the value N could be set between 2 and 6.

As illustrated with arrow 222, mobile node 250 sends an RRC physical channel reconfiguration complete message to NB 252.

As illustrated with arrow 223, NB 252 sends acknowledgement to the physical channel reconfiguration in a Radio Link Control (RLC) message.

As illustrated with arrow 224, NB 254 broadcasts system information so that it is received by mobile node 250. The system information comprises a PLMN identifier and a cell identifier, which may be a PCI/PSC or an ECGI/cell identity. In response to the reception of the system information, mobile node 250 detects that the cell identified by the cell identifier does not belong to the NCR list. Hence, mobile node 250 records information on the cell broadcasted by NB 254 to an entry in a local neighbor cell relation table. The table comprises entries comprising an identifier of the cell that sent the automatic neighbor cell reporting request and identifiers of new cell detected that do not belong to the NCR list. The cell identifiers may comprise PCIs/PSCs or ECGIs/cell identities.

As illustrated with arrow 225, NB 256 broadcasts system information so that it is received by mobile node 250. The system information comprises a PLMN identifier and a cell identifier, which may be a PCI/PSC or an ECGI/cell identity. In response to the reception of the system information, mobile node 250 detects that the cell identified by the cell identifier does not belong to the NCR list. Hence, mobile node 250 records information on the cell broadcasted by NB 256 to an entry in a local neighbor cell relation table in the memory of mobile node 250. Due to the fact that mobile node 250 detects that it has collected two entries in its memory, mobile node 250 starts reporting the local neighbor cell relation table information to NB 252.

As illustrated with arrow 226, mobile node 225 sends a cell update message to NB 252 in order to indicate that there is now available automatic neighbor relation information to be reported to NB 225.

As illustrated with arrow 227, NB 252 replies with a cell update confirm message. The cell update confirmation message comprises at least one parameter that causes mobile node 250 to enter the cell-FACH state.

As illustrated with arrow 228, mobile node 250 sends a mobility information confirm message to NB 252.

As illustrated with arrow 208, NB 252 sends a UE information request message to mobile node 250, which comprises a request to return automatic neighbor relation information collected.

As illustrated with arrow 209, mobile node 250 sends the local neighbor cell relation table to NB 252 in a UE information response message.

In one embodiment of the invention, the networks the NBs 254 and 256 may also belong to an E-UTRAN or a GERAN.

The embodiments of the invention described hereinbefore in association with FIGS. 2A and 2B may be used in any combination with each other. Several of the embodiments may be combined together to form a further embodiment of the invention.

Figure 3:
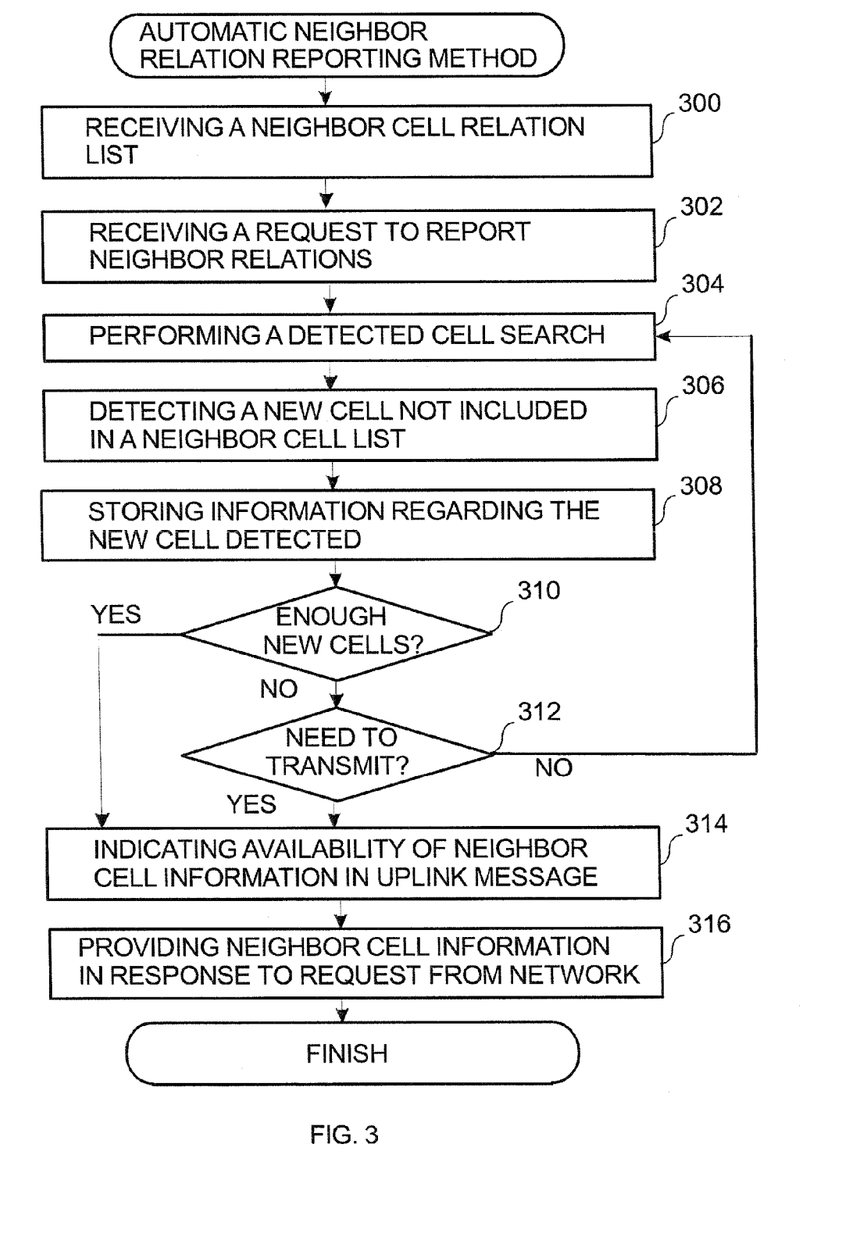
FIG. 3 is a flow chart illustrating a method for automatic reporting of neighbor relations in one embodiment of the invention.

FIG. 3 is a flow chart illustrating a method for automatic reporting of neighbor cell relations in one embodiment of the invention.

At step 300 a neighbor cell relation list is received by a mobile node. The neighbor cell relation list may be broadcasted by a base station.

In one embodiment of the invention, the base station is an UTRAN NB.

At step 302 a request to report neighbor cell relations is received by a mobile node. The neighbor cell relations to be reported are for cells not included in the neighbor cell relation list. The request to report neighbor cell relations may be broadcasted by a base station or it may be transmitted to the mobile node in a physical channel reconfiguration message. The request to report neighbor cell relations may comprise a threshold number N of neighbor cell relations that must be gathered before the neighbor cell relations gathered after the request are reported to the base station.

At step 304 the mobile node performs a cell search for new cells.

At step 304 the mobile node detects a new cell not included in the neighbor cell relation list received at step 300.

At step 306 the mobile node stores information regarding the new cell detected to a memory. The information may be stored as an entry of a local neighbor cell relation table. The table entries may comprise cell identifiers for the current cell and a neighbor cell.

At step 308 the mobile node determines if it has gathered N neighbor cell relations. If the mobile node has gathered N neighbor cell relations, the method continues at step 312, otherwise the method continues at step 310.

At step 310 the mobile node determines if there is a need to transmit uplink information to the base station. Uplink information transmission may be required, for example, due a registration, a call setup, a cell reselection or pending uplink user plane data.

At step 312 the mobile node indicates the availability of neighbor cell relation information in an uplink message.

In one embodiment of the invention, the uplink message is a radio resource control connection request.

At step 314 the mobile node provides neighbor cell relation list to the base station. The neighbor cell relation list may be reported in response to a separate request message from the base station.

The embodiments of the invention described hereinbefore in association with FIG. 3 may be used in any combination with each other. Several of the embodiments may be combined together to form a further embodiment of the invention.

Figure 4:
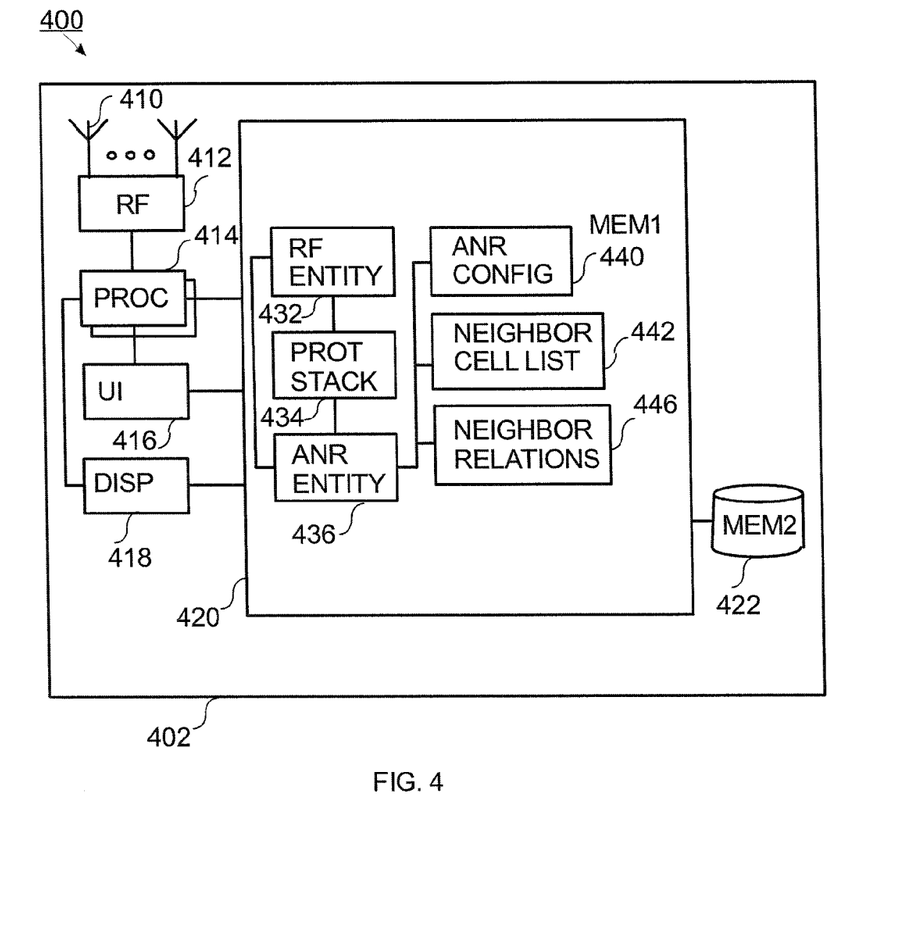
FIG. 4 is a block diagram illustrating a mobile node in one embodiment of the invention.

FIG. 4 is a block diagram illustrating an apparatus in one embodiment of the invention. In FIG. 4 there is an apparatus 400, which is, for example, a mobile node, user equipment, cellular phone, a mobile terminal, an Application Specific Integrated Circuit (ASIC) or any chip. Apparatus 400 may correspond to a mobile node illustrated in FIGS. 1, 2A, 2B and 3. The internal functions of mobile node 400 are illustrated with a box 402. Mobile node 400 comprises at least one antenna 410. There may be multiple input and output antennas. In association with mobile node there is Radio Frequency (RF) circuit 412. RF circuit 412 is communicatively connected to at least one processor 414. Connected to processor 414 there is a first memory 420, which is, for example, a Random Access Memory (RAM). There may also be a second memory 422, which may be a non-volatile memory, for example, an optical or magnetic disk. There may also be a User Interface (UI) 416 and a display 418. In memory 420 there may be stored software relating to functional entities 432, 434 and 436. An RF entity 432 communicates with RF circuit 412 to perform radio related measurements and to obtain measurement results. There is a protocol stack entity 434 which comprises the user plane and control plane protocol functions related to the interface towards a NB or any base station. There is also a neighbor cell relation entity 436, which controls the storing of a local neighbor cell relation table and the reporting of information gathered in the local neighbor cell relation table. Neighbor cell relation entity 436 stores and accesses an automatic neighbor cell relation configuration 440, a neighbor cell relation list 442 and a neighbor cell relation table 444. Automatic neighbor cell relation configuration 440 comprises the threshold number N of neighbor cell relations that must be gathered before reporting to the base station. Automatic neighbor cell relation configuration 440, neighbor cell relation list 442 and neighbor cell relation table 444 may also be stored in a non-volatile memory such as memory 422.

When the at least one processor 414 executes functional entities associated with the invention, memory 420 comprises entities such as, any of the functional entities 432, 434 and 436. The functional entities within apparatus 400 illustrated in FIG. 4 may be implemented in a variety of ways. They may be implemented as processes executed under the native operating system of the network node. The entities may be implemented as separate processes or threads or so that a number of different entities are implemented by means of one process or thread. A process or a thread may be the instance of a program block comprising a number of routines, that is, for example, procedures and functions. The functional entities may be implemented as separate computer programs or as a single computer program comprising several routines or functions implementing the entities. The program blocks are stored on at least one computer readable medium such as, for example, a memory circuit, memory card, magnetic or optical disk. Some functional entities may be implemented as program modules linked to another functional entity. The functional entities in FIG. 4 may also be stored in separate memories and executed by separate processors, which communicate, for example, via a message bus or an internal network within the network node. An example of such a message bus is the Peripheral Component Interconnect (PCI) bus.

The exemplary embodiments of the invention can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (for instance, voice, modem, and the like), wireless communications media, one or more wireless communications networks, cellular communications networks, 3 G communications networks, 4 G communications networks Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices, or one or more software entities such as modules.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of application-specific integrated circuits or by interconnecting an appropriate network of conventional component circuits, as will be appreciated by those skilled in the electrical art(s).

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Nonvolatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

The embodiments of the invention described hereinbefore in association with FIGS. 1, 2A, 2B, 3 and 4 may be used in any combination with each other. Several of the embodiments may be combined together to form a further embodiment of the invention.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method, comprising:
receiving a neighbor cell relation list at a mobile node;
receiving a request to report new cells not comprised in the neighbor cell relation list at the mobile node;
storing in a memory of the mobile node, a threshold number of new cells, not comprised in the neighbor cell relation list, that must be detected, in order to reach a condition for transmitting information regarding at least one new cell not comprised in the neighbor cell relation list, wherein the threshold number is configured as a natural number at least 2 by broadcasting signaling from the radio network node;
detecting, in the mobile node, the at least one new cell not comprised in the neighbor cell relation list;
storing information regarding the at least one new cell not comprised in the neighbor cell relation list in a memory of the mobile node;
determining whether the threshold number is reached; and
preparing for transmitting the information regarding the at least one new cell not comprised in the neighbor cell relation list to the radio network node.

2. The method according to claim 1, the method further comprising:
determining a need for uplink data transmission; and, in response to the need for uplink data transmission, preparing for transmitting the information regarding the at least one new cell not comprised in the neighbor cell relation list to the radio network node.

3. The method according to claim 1, wherein the threshold number is received in association with the request to report new cells not comprised in the neighbor cell relation list.

4. The method according to claim 1, wherein the information, regarding the at least one new cell not comprised in the neighbor cell relation list, comprises a cell identifier for the cell in which the request to report was received and cell identifiers for the new cells not comprised in the neighbor cell relation list.

5. The method according to claim 1, the method further comprising:
conducting a cell search by the mobile node.

6. The method according, to claim 1, the method further comprising:
indicating availability of information on at least one new cell not comprised in the neighbor cell relation list to the radio network node in at least one of a connection request message, a cell update message, a routing area update message, a connection setup complete or a reconfiguration complete message.

7. The method according to claim 1, the method further comprising:
receiving, from the radio network node, an information request message for the at least one new cell not comprised in the neighbor cell relation list; and
transmitting, by the mobile node, the at least one new cell not comprised in the neighbor cell relation list to the radio network node in an information response message.

8. The method according to claim 1, wherein the request to report new cells not comprised in the neighbor cell relation list is provided on a dedicated control channel.

9. The method according to claim 8, wherein the request to report new cells not comprised in the neighbor cell relation list is comprised in a system information block or a radio resource control message.

10. The method according to claim 1, wherein the request to report new cells not comprised in the neighbor cell relation list further comprises the threshold number.

11. The method according to claim 1, wherein the mobile node comprises a Long-Term Evolution (LTE) User Equipment.

12. The method according to claim 1, wherein the radio network node is a UMTS Radio Access Network (UTRAN) node.

13. An apparatus, comprising:
at least one processor and a memory storing at least one computer program which together are configured to receive a neighbor cell relation list, to receive a request to report new cells not comprised in the neighbor cell relation list, to store a threshold number of new cells, not comprised in the neighbor cell relation list, that must be detected, in order to reach as condition for transmitting information regarding at least one new cell not comprised in the neighbor cell relation list, to detect the at least one new cell not comprised in the neighbor cell relation list, to store information regarding the at least one new cell not comprised in the neighbor cell relation list in the memory, to determine whether the threshold number is reached, and to prepare for transmitting the information regarding the at least one new cell not comprised in the neighbor cell relation list to a radio network node, wherein the threshold number is configured as a natural number at least 2 by broadcast signaling from the radio network node.

14. A radio network node, comprising:
at least one processor and a memory storing at least one computer program which together are configured to broadcast a neighbor cell relation list, to transmit a request to report new cells not comprised in a neighbor cell relation list to a mobile node, the request comprising a threshold number of new cells not comprised in the neighbor cell relation list that must be detected by mobile nodes before reporting, and to receive information regarding at least one new cell not comprised in the neighbor cell relation list, wherein the threshold number is configured for the mobile node as a natural number at least 2 by broadcast signaling from the radio network node.

15. A non-transitory computer readable memory tangibly storing at least one computer program comprising code adapted to cause the following when executed on a data-processing system:
receiving a neighbor cell relation list;
receiving a request to report new cells not comprised in the neighbor cell relation list;
storing a threshold number of new cells, not comprised in the neighbor cell relation list, that must be detected, in order to reach a condition for transmitting information regarding at least one new cell not comprised in the neighbor cell relation list, wherein the threshold number is configured as a natural number at least 2 by broadcast signaling from the radio network node;
detecting the at least one new cell not comprised in the neighbor cell relation list;
storing information regarding the at least one new cell not comprised in the neighbor cell relation list in the memory;
determining whether the threshold number is reached; and preparing for transmitting the information regarding the at least one new cell not comprised in the neighbor cell relation list to the radio network node.

* * * * *